May 23, 1950     R. T. FENN     2,508,505
APPARATUS FOR TESTING AND CALIBRATING WATT-HOUR METERS
Filed Oct. 19, 1945

INVENTOR
Raymond T. Fenn
By Owen W. Kennedy
ATTORNEY

Patented May 23, 1950

2,508,505

UNITED STATES PATENT OFFICE 2,508,505

APPARATUS FOR TESTING AND CALIBRATING WATT-HOUR METERS

Raymond T. Fenn, Springfield, Vt.

Application October 19, 1945, Serial No. 623,355

1 Claim. (Cl. 175—183)

The present invention relates to an improved method of and apparatus for testing and calibrating watthour meters of the type commonly employed by commercial distributors of electrical power for measuring the amount of electrical energy consumed by customers. The object of the invention is to provide an arrangement for conveniently testing and calibrating a watthour meter at the place where it is installed on the premises of a customer, thereby eliminating the usual practice of periodically removing such meters from customers' premises to a central location where testing equipment is maintained by the power distributing company.

According to the present invention, a standard watthour meter can be tested at the place where it is installed and its actual operation under load visually checked with the operation of a master meter, by providing the meter under test with a simple attachment in the form of a light reflecting device, the functioning of which can be readily compared with the functioning of a similar device on the master meter. By reason of the simplicity and portability of my improved testing equipment, it is possible to quickly test and adjust a consumer's watthour meter at the place where it is installed, so that the meter will thereafter operate with a high degree of accuracy in the measurement of consumers' current.

The above and other advantageous features of the invention will hereinafter more fully appear from the following description, considered in connection with the accompanying drawings, in which.

Figure 1:
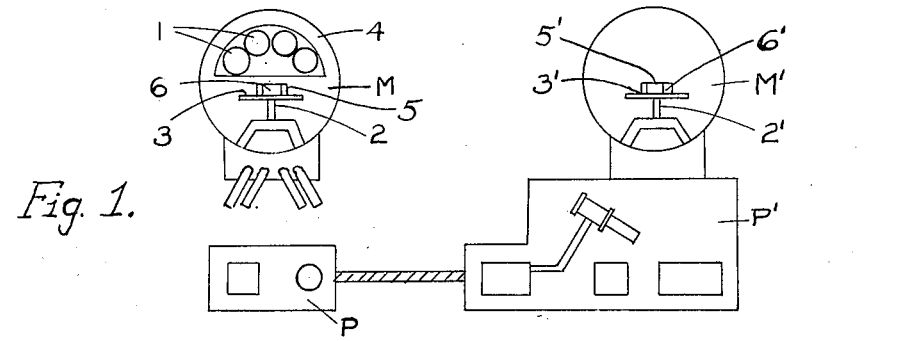
Fig. 1 illustrates the external appearance of a conventional customer's watthour meter, in association with the portable testing apparatus and a master meter.

Referring to the drawing, Fig. 1 illustrates the appearance of a conventional watthour meter M, as installed in a customer's premises or adjacent thereto, with the meter M providing the usual integrating mechanism and recording dials 1 for indicating the amount of power consumed. The meter M provides the usual shaft 2 carrying a disk 3 which rotates at a speed determined by the amount of current consumed to drive the integrating mechanism. In order that the dials of the meter M may be conveniently read from time to time, the mechanism of the meter is enclosed in a glass casing 4, so that the rotor disk 3 is also visible at all times, with the disk 3, theoretically at least, being at rest when no power is being consumed.

The test arrangement of the present invention makes use of the fact that the meter cover 4 is readily removable in any location where the meter M may be installed, and where adjustments to the meter may be made. For the purpose of testing, the shaft 2 of the meter M is provided with a reflector 5 presenting a series of plane reflecting surfaces 6 arranged about the axis of the shaft. Consequently, these reflecting surfaces 6 will successively come into view from a point adjacent the meter, whenever the meter shaft 2 rotates by reason of passage of current through the meter M.

Figure 2:
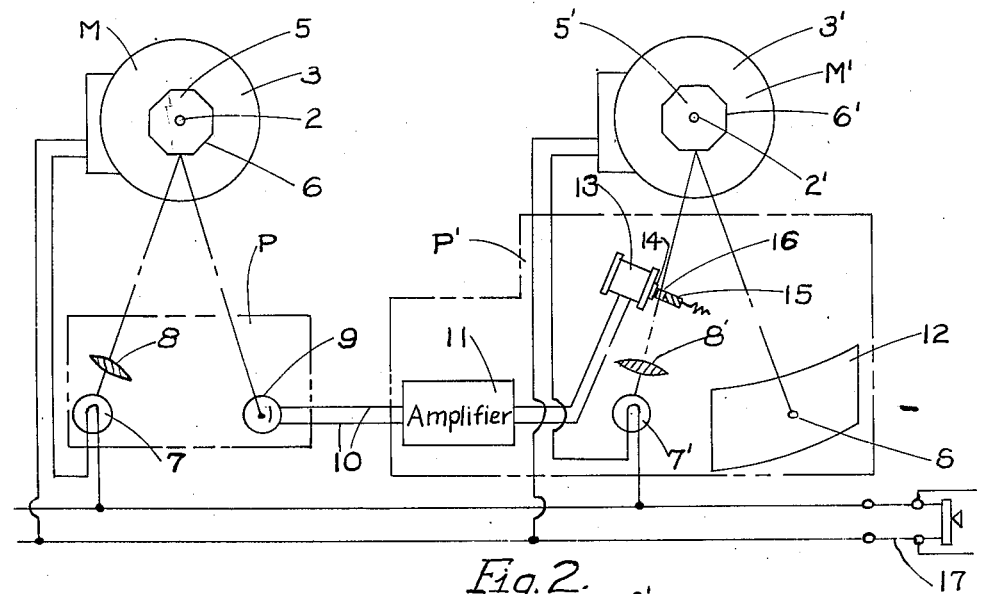
Fig. 2 is a diagrammatic view illustrating the performance of a test in accordance with the practice of the invention.

Referring now to Fig. 2, the arrangement of the present invention also contemplates the employment of a portable testing assembly or panel P in association with the meter M to be tested, the panel P being indicated diagrammatically by dot and dash lines. The panel may be conveniently attached to meter M by the cover attaching devices and provides means for utilizing the reflector 5 on the meter shaft for testing and calibrating the meter M where it is installed. For this purpose, the panel P provides a light source 7 in the form of a lamp of known wattage, which light source is adapted to transmit light rays through a lens 8 mounted on the panel P so as to strike the reflecting surfaces 6 of the reflector 5 whenever the shaft 2 rotates. Reflected light rays from the meter M under test are adapted to impinge upon a photoelectric cell 9, also mounted on the panel P, and electrical impulses from the cell 9 are adapted to be carried by conductors 10 to a suitable electronic amplifier 11, which forms part of testing equipment mounted on a panel P' that is associated with a master meter M'.

This master meter M' has been carefully checked with known standards as to the accuracy of its readings, so that its operation may be used to check the accuracy of any installed meter, such as the meter M. The master meter M' may be of any suitable type and, for purposes of illustration, it is shown with its rotor shaft 2' provided with a reflector 5' similar to the reflector 5, in that it presents a series of plane reflecting surfaces 6' arranged about the axis of the rotor shaft 2'. The testing panel P' further provides a light source 7' and a lens 8' is adapted to project light rays from the source 7' so as to strike the surfaces 6' of the reflector 5' as the rotor shaft 2' rotates. For purposes of illustration, the number of surfaces 6 and 6' on the reflectors 5 and 5' is shown as being the same, although this is not essential, as explained hereafter.

The panel P' also carries a translucent screen 12 mounted where it may be readily observed, and a projected light ray from the source 7' will be reflected so as to appear as a light spot S substantially centered on the screen 12, as indicated. With the arrangement described thus far in connection with the master meter M', rotation of the master meter shaft 2' will cause the light spot S to be intermittently flashed on the screen 12 as the projected light ray from the source 7' successively impinges upon the revolving surfaces 6' of the reflector 5'. Obviously, this intermittent appearance of the light spot S on the screen 12 will continue at a rate dependent upon the speed of the master meter shaft 2', as long as the shaft rotates, and in the absence of any factors affecting the continuous transmission of light rays from the source 7' to the reflector 5'.

As previously pointed out, electrical impulses from the photoelectric cell 9 are adapted to be stepped up by the amplifier 11 mounted on the panel P'. The output of the amplifier 11 is adapted to energize a solenoid 13, and with the arrangement previously described with reference to the panel P, the solenoid 13 will be energized each time a light ray is transmitted to the cell 9 from the source 7, as a result of revolution of the reflecting surfaces 6 with the shaft 2 of the meter M that is to be tested.

The magnetic armature or plunger 14 of the solenoid operates a slidably mounted shutter or light gate 15 having an opening 16 through which a light ray from the source 7' may pass to the reflector 5' when the solenoid 13 is energized. However, should the solenoid be deenergized, the light gate 15 will block the light ray and it is obvious that the particular moment at which the opening 16 permits the passage of this light ray will determine the angle of incidence of the ray with a reflector surface 6'.

As shown in Fig. 2, the light gate 15 is open at the same moment the ray from the light source 7' is striking a reflector surface 6', so that the reflected light spot S is centered on the screen 12. However, should the light gate 15 be opened either in advance of or after the reflector 5' on the master meter M' reaches the position of Fig. 2, the light spot S will appear to one side or the other of the center of the screen 12.

When it is desired to check and calibrate an installed meter M which has previously been provided with a reflector 5, the arrangement is set up as shown in Fig. 2, with the panel P adjacent the meter under test and with the other panel P' adjacent the master meter M'. At this time it may be assumed that the rotors of both meters are stationary, i. e., with the meters under no load conditions, and that the light sources 7 and 7' are not illuminated, by reason of the fact that the control switch 17 for the test panels is then open. However, when the switch 17 is closed to connect the panels to a commercial power source as indicated, both meters M and M' are subjected to the same electrical load, and both light sources 7 and 7' are illuminated.

Therefore, when the reflector 5' of the master meter M' starts to rotate, the light gate 15 has already been opened by the initially reflected ray of light from the source 7 to the cell 9. Assuming then that the meter M under test is accurate, both reflectors 5 and 5' will turn at exactly the same rate, and the gate opening 16 will permit passage of the ray from the source 7' at such an angle with respect to the reflecting surfaces 6' as to cause the light spot S to appear intermittently in the center of the screen 12. The light spot S will appear on the screen with a frequency dependent upon the rate of movement of the reflector 5', which is directly related to the speed of the master meter M', and if the meter M under test is rotating in exact synchronism with the master meter, it follows that the light spot S will appear successively in the same place on the screen 12. However, should the meter M under test be running the least bit fast or slow, as compared to the master meter M', successive energizations of the solenoid 13 by the photoelectric cell 9 will be out of step with the movement of the reflector 5' on the master meter.

The net result will be to shift the light spot S to the right or to the left of the center of the screen 12, due to the amount that the light gate operation is out of phase with the successive arrivals of the reflector surfaces 6' in line with the axis of the projecting lens 8'. Therefore, when the meter M under test is not in synchronism, successive appearances of the light spot S will trace a path across the screen 12, with the direction of this apparent travel of the spot to one side or the other of the screen center indicating whether the meter under test is running faster or slower than the master meter.

Assuming that a test of an installed meter has been carried on as described above, the person making the test will obtain a graphic visual indication on the screen 12 as to the degree to which the meter under test may be running fast or slow. Obviously, the meter tester can make slight adjustments to the meter under test in order to correct any fast or slow tendency and, by continuing the tests, quickly determine whether or not the adjustments have been properly made. All these operations may be performed without removing the meter under test from its place of installation. Or, if a meter under test appears to be so badly out of adjustment as to necessitate its removal, obviously a replacement meter can be installed and quickly checked as to its accuracy by performing the same steps outlined above and observing the position of the light spot S on the screen 12.

Figure 3:
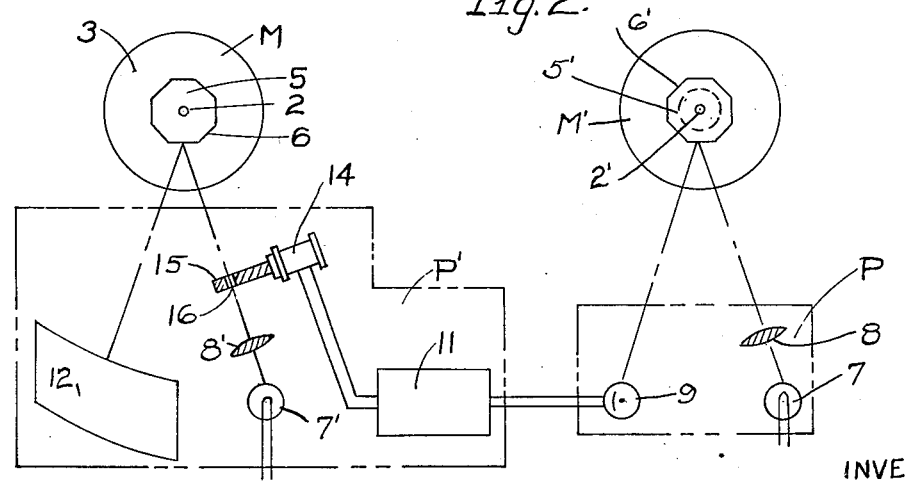
Fig. 3 is a diagrammatic view showing a modification of the arrangement of Fig. 2.

While the equipment on the panels P and P' is shown and described as being associated with the meters M and M', respectively, obviously the apparatus for carrying out the invention is susceptible of being arranged in a different manner to obtain substantially the same results. For example, there is shown in Fig. 3 a modified arrangement, wherein the panel P' with the amplifier 11, observing screen 12 and light gate 15 is installed in association with the meter M to be tested. Similarly, the panel P with the light source 7 and photoelectric cell 9 is associated with the master meter M'. This modified arrangement possesses certain advantages over the arrangement of Fig. 2, in that the person making the test can observe the screen 12 while making any necessary adjustments required for the meter under test, without having his attention distracted by referring to the master meter. In other words, the modified arrangement of Fig. 3 makes it readily possible to test a meter installed in a place where it might be difficult to mount the master meter, with the length of the conductors 10 between the photoelectric cell 9 and the amplifier 11 making possible any desired spacing between the panels P and P' to meet conditions of the test.

As previously pointed out, while the number of reflecting surfaces 6 and 6' on the reflectors 5 and 5' is shown as being the same for purposes of illustration, this is not essential and will depend upon the meter constants. That is to say, if the meter M under test and the master meter M' make the same number of revolutions per watthour, the number of reflecting surfaces 6 and 6' will be the same. If, however, the meter shafts 2 and 2' run at different base speeds, the number of surfaces 6 and 6' on the reflectors will be determined from the least common denominator of these speeds. With any relation, the mode of testing and calibrating the customer's meter remains the same.

From a consideration of the foregoing, it is apparent that the practice of the present invention permits a customer's watthour meter to be tested and calibrated where it is installed, so that the complaint of any customer can be quickly checked and remedied in the presence of the customer, if desired. Thus in cases where the customer complains of being overcharged for electrical energy, and the meter indicates more energy than actually passes through it, it is desirable to determine the actual percentage of error at the time of test. In this case, a variable ratio transmission can be provided between the shaft 2' of the master meter M' and its reflector 5', and the ratio would be adjusted until the meters appear to be indicating exactly the same. The amount of adjustment to obtain this result would then indicate the percentage error of the customer's meter M, and such an adjustment can be readily made with the meter cover removed and while the test panel P is attached to the meter as previously described.

I claim:

In combination, first and second rotatable elements each having a plurality of substantially flat light-reflecting areas circumferentially spaced about the periphery thereof, first and second light sources each directing its rays toward a respective one of said rotatable elements, a screen positioned to receive light rays reflected from said first rotatable element, a stationary light-sensitive cell positioned for receiving intermittent flashes of reflected light rays from said second rotatable element, a vibratory light gate interposed between said first light source and said first rotatable element, and means controlled by said light-sensitive cell for actuating said gate back and forth in timed relation with the intermittent flashes received by said cell from said second rotatable element thereby to project intermittent flashes of light from said first light source upon said first rotatable element.

RAYMOND T. FENN.

REFERENCES CITED

The following references are of record in the file of this patent:

UNITED STATES PATENTS

| Number | Name | Date |
|---|---|---|
| 1,819,494 | Aronoff | Aug. 18, 1931 |
| 1,853,657 | Bradshaw et al. | Apr. 12, 1932 |
| 1,864,677 | Sparkes | June 28, 1932 |
| 1,878,658 | Aronoff | Sept. 20, 1932 |
| 1,889,128 | McClintock | Nov. 29, 1932 |
| 1,949,743 | Holmes | Mar. 6, 1934 |